United States Patent [19]

Green et al.

[11] Patent Number: 5,035,360

[45] Date of Patent: Jul. 30, 1991

[54] ELECTRICALLY ACTUATED GASEOUS FUEL TIMING AND METERING DEVICE

[75] Inventors: Christopher J. Green, Don Mills; James S. Wallace, Mississauga, both of Canada

[73] Assignee: The University of Toronto Innovations Foundation, Toronto, Canada

[21] Appl. No.: 546,749

[22] Filed: Jul. 2, 1990

[51] Int. Cl.[5] .................. F02M 51/00; F02M 21/02
[52] U.S. Cl. ............................ 239/585; 251/129.09
[58] Field of Search .................. 239/585; 251/129.09

[56] References Cited

U.S. PATENT DOCUMENTS

| | | | |
|---|---|---|---|
| 2,911,183 | 11/1959 | Matthews et al. | 251/129.09 |
| 4,156,506 | 5/1979 | Locke et al. | 239/585 |
| 4,653,720 | 3/1987 | Knapp et al. | 239/585 |
| 4,678,160 | 7/1987 | Yamada et al. | 239/585 |
| 4,922,121 | 5/1990 | Taft | 251/129.09 |

FOREIGN PATENT DOCUMENTS 2131917   6/1984   United Kingdom ........... 251/129.09

Primary Examiner—Andres Kashnikow
Assistant Examiner—Karen B. Merritt
Attorney, Agent, or Firm—Shoemaker and Mattare, Ltd.

[57] ABSTRACT

A device for timing and metering gaseous fuels into an internal combustion engine has a cylindrical solenoid cavity with a portion projecting away from the cavity containing a bore coaxial with the cylindrical cavity. The portion also has gas passageways. An injector tip is secured to the portion so that it can be adjusted in position toward and away from the cavity. The injector tip has an orifice, and a valve head on a pintle moving in the bore is adapted to open and close the orifice. The other end of the pintle is secured to the armature of a multipole solenoid which includes a plurality of plate-like, spaced ribs covering a substantially circular configuration and located within the cavity. The length of the pintle is such that, when the head is seated against the valve seat to close the orifice, the armature is spaced from the ribs, and when the armature is seated against the ribs, the head is off the valve seat, thus opening the orifice.

5 Claims, 12 Drawing Sheets

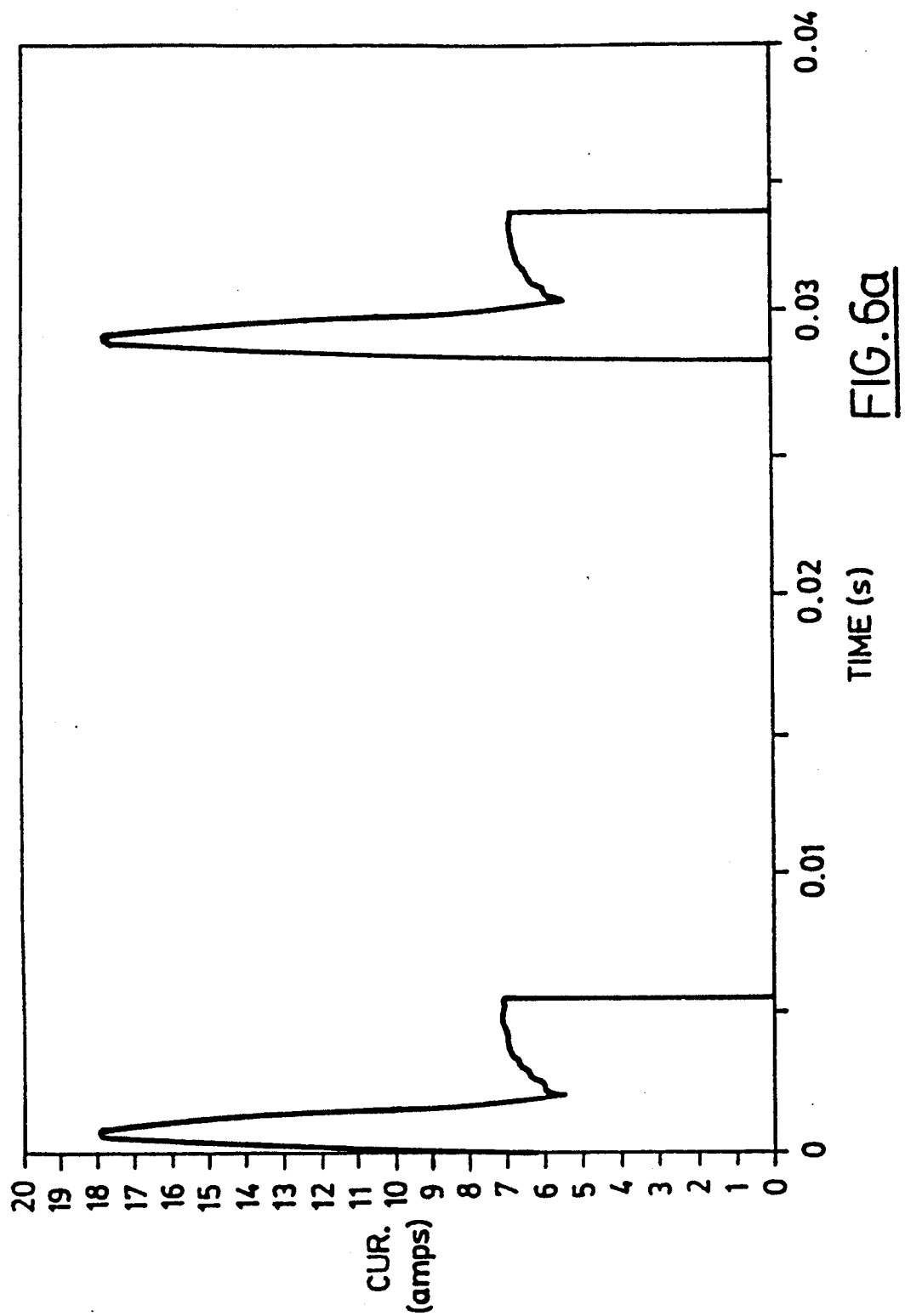

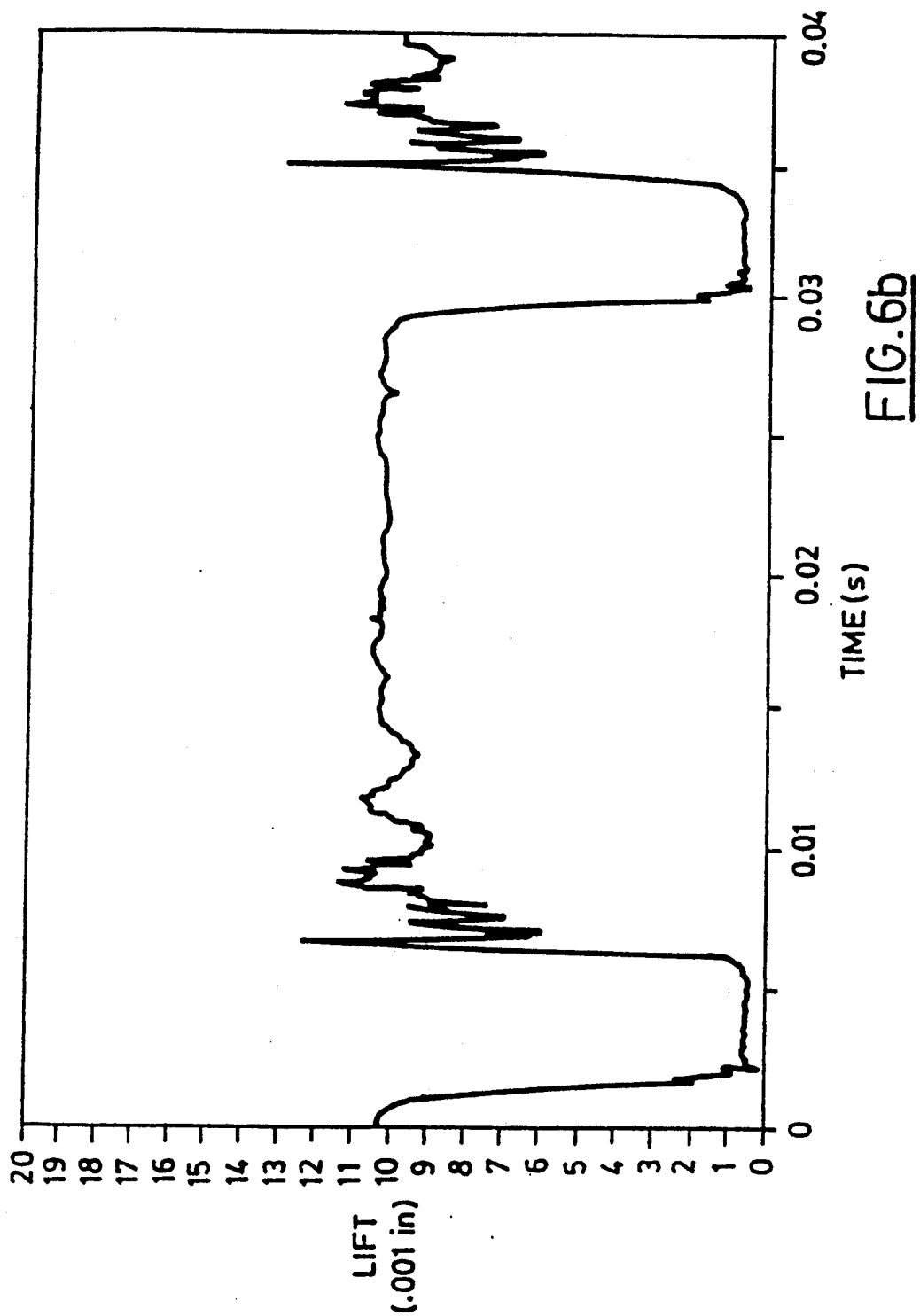

ELECTRICALLY ACTUATED GASEOUS FUEL TIMING AND METERING DEVICE

This invention relates to an electrically actuated gaseous fuel timing and metering device, and has to do particularly with a device of this kind which is of simple but robust construction and which is capable of a large turn-down ratio.

BACKGROUND OF THIS INVENTION

Newly legislated exhaust emission standards for heavy duty diesel engines have revived interest in the use of alternate fuels. Fuel substitution is one possible means of reducing emissions sufficiently to comply with the new standards. Two gaseous fuels, compressed natural gas (CNG) and hydrogen, are among the alternative fuels having the potential to reduce emissions. We have now designed a fast-acting injector which, among a number of different uses, can be employed for timed port injection of CNG into a two-stroke diesel engine (with minor modifications for hydrogen). The CNG is injected into the cylinders through the cylinder liner ports from approximately bottom dead center (BDC) to 60° after BDC. At an operating speed of 2100 RPM, this allows approximately 5 ms to inject the fuel. Our major design target for this particular application of the device was the delivery of an average CNG flowrate of 6.35 Kg/hr (14 lbm/hr) at injection durations of 5.0 ms and a frequency of 2100 injections per minute. We stress, however, that this unit can be applied in a general way for the metering and timing of gaseous fuel to any engine, whether 2-stroke or 4-stroke, and regardless of where, in the cylinder, the gaseous fuel is injected.

GENERAL DESCRIPTION OF THIS INVENTION

The following were objects of one aspect of this development:
 (a) injection duration dynamically controllable from 0.0 ms to 8.0 ms, (8 ms represented 150% of maximum expected operating duration);
 (b) dynamically adjustable injection timing;
 (c) able to supply the design CNG flowrate to the cylinder with an injector inlet pressure of 2.0 MPa(300 psi);
 (d) able to withstand internal pressures of 21 MPa(3000 psi);
 (e) produce an instantaneous mass flowrate of 36.2 Kg/hr (80 lbm/hr) of CNG when open (average mass flowrate of 6.35 Kg/hr (14 lbm/hr) prorated to 63° of crank rotation);
 (f) operate at temperatures between 10° C. and 130° C.;
 (g) be fail safe in operation, i.e. failure in actuator power should result in a closed valve;
 (h) capable of operation from an automotive electrical system;
 (i) be producible with standard machining techniques;
 (j) be amenable to performance monitoring such as measurement of valve pintle lift;
 (k) have a suitable life or mean time between failures for engine testing;
 (l) actual sizing to allow for installation in a 6V92TA two stroke Detroit Diesel engine.

Our design for the injector was based on direct electromagnetic actuation, utilizing a high energy multipole solenoid to impart direct actuation to the pintle (valve). Although actuating power requirements are higher than those of an electrohydraulic option, they are well below those of the piezoelectric method. Our approach simplifies the design and removes the need for any dynamic seals or displacement magnifiers.

More particularly, this invention provides a device for timing and metering gaseous fuels, comprising:
 means defining a substantially cylindrical solenoid cavity open at one end of the cylindrical configuration, said means including a portion projecting away from the cavity in the direction opposite said one end, said portion having a bore coaxial with said cylindrical configuration, gas passageway means in said portion,
 an injector tip secured to said portion in such a way that its position is adjustable longitudinally with respect to said bore, the injector tip defining an injector orifice, a valve seat upstream of said orifice and coaxial with said bore, and a chamber upstream of said valve seat, said chamber communicating with said cavity through said passageway means,
 an elongate pintle snugly but slidably lodged within said bore, the pintle having at one end a closure head located within said chamber, the closure head being adapted to seat against said valve seat to close said orifice,
 resilient means for urging said closure head against said valve seat to close said orifice,
 an electrically actuated multipole solenoid including a base constituting a cap for closing the open end of said cavity, a first plurality of spaced-apart, unwound cap ribs projecting into the cavity from the base and being in magnetic communication with said base, a second plurality of cap ribs wound with magnet wire interspersed between said first plurality of ribs and being in magnetic communication with said base, all ribs terminating at a common first surface, and
 an armature of ferromagnetic material for the solenoid, said armature being secured to the other end of said pintle and defining a second surface complementary to said first surface, the pintle having a length such that, when the head is seated against said valve seat the armature is spaced from said ribs, and when the armature is seated against said ribs, the head is off said valve seat, thus opening said orifice.

GENERAL DESCRIPTION OF THE DRAWINGS

One embodiment of this invention is illustrated in the accompanying drawings, in which like numerals denote like parts throughout the several views, and in which:

FIG. 6a is a time vs. current graph useful in explaining the present invention;

FIG. 6b is a lift vs. time graph also useful for explaining the present invention;

DETAILED DESCRIPTION OF THE DRAWINGS

The following description pertains to a single embodiment, but should not be taken as limiting the scope of the invention. This device can be much more general in its application.

Figure 1:
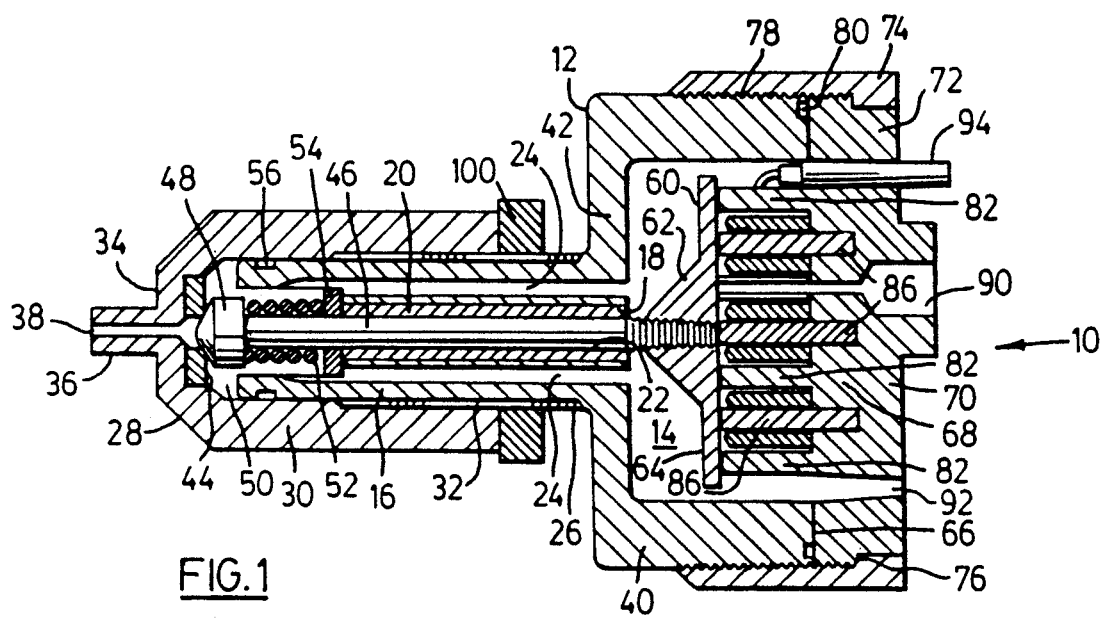
FIG. 1 is an axial sectional view through a device for timing and metering gaseous fuels, showing one embodiment of this invention.

The size of the preferred embodiment of the injector was dictated by force requirements and by the necessity that it fit in the side access ports of a 6V92 engine. This necessitated a large diameter head and a stubby nozzle with a minimum sac volume. FIG. 1 shows a cross-sectional view of the developed injector.

The wall thickness and other strength requirements were based on a worst case scenario of combustion taking place within the injector. A pressure of 3000 psi, 10 times the supply pressure, was used as the design upper limit.

Because of the low density of CNG, even at 2.0 MPa (300 psi) it is necessary to deliver a large volume of CNG to the combustion chamber in each cycle. Based on standard fuel consumption data, about 0.08 cc of diesel fuel would be required to completely consume all of the air in the cylinder of the diesel engine used in this project. In contrast, even at the supply pressure of 2.0 MPa (300 psi) used in the CNG experiments, the volume of CNG required to completely consume all of the oxygen in the cylinder is 3.5 cc, a volume nearly fifty times the volume of diesel fuel required. This tremendous difference in volume of fuel to be delivered requires larger passages for CNG flow in the injector and higher lift of the pintle above its seat. The dimensions of the nozzle orifice control the CNG flow and are therefore the key to establishing the overall dimensions of the injector. The nozzle orifice was sized to deliver the maximum amount of CNG required by the engine. In carrying out this calculation, the following assumptions were made:

1. Maximum injector operating speed is 2100 injections per minute.
2. Maximum injection duration is 5 ms.
3. CNG flow is controlled only by the total area of the nozzle orifice as long as the internal injector passageways have twice that area.
4. The transition period from zero flow to steady state conditions is much smaller than the total duration.

The flow of CNG through the injector was determined by the injector tip orifice diameter. The injector tip was sized to accommodate a passage as large as 4.0 mm (0.160 in.) in diameter underneath the pintle head, although the final nozzle had a 1.88 mm (0.074 in.) diameter passage. The pintle lift required was determined by the minimum seated diameter of the pintle.

The area produced by this diameter must be greater then the nozzle passage area. This set the minimum pintle lift at 0.254 mm (0.010 in.).

In designing an injector to deliver timed flows of CNG through the intake ports of a two-stroke diesel engine, the following characteristics of conventional diesel fuel injectors were the design goal:

1. approximately constant rates of injection;
2. load control by variation of injection duration;
3. injection consistency from cycle-to-cycle;
4. rapid injector opening and closing with no secondary injection or after injection.

Attention is now directed to FIG. 1, which shows at 10 a device for timing and metering gaseous fuels. The device 10 includes an injector head 12 constructed of a non-magnetic metal, preferably brass. The head 12 constitutes means defining a substantially cylindrical solenoid cavity 14 and includes a portion 16 which projects leftwardly from the cavity as illustrated in FIG. 1. The portion 16 has a bore 18 coaxial with the cylindrical cavity 14 and containing a press-fit bearing 20 defining a further central bore 22, also coaxial with the cylindrical cavity 14. The portion 16 further contains a plurality of passageways 24, constituting gas passageway means through which compressed natural gas (or other gaseous fuel) can be removed from the cavity 14. As can be seen in FIG. 1, the passageways 24 communicate directly with the cavity 14. Preferably, the passageways 24 are distributed uniformly around the bore 18 containing the bearing 20, and may typically be four, six or eight in number.

As illustrated, the portion 16 is substantially cylindrical in outer configuration, and has external teeth 26 adapted to be engaged by internal teeth on an injector tip 28. In the embodiment illustrated, the injector tip 28 is generally cup-shaped, including a cylindrical wall 30 having internal teeth 32 engaging the external teeth 26, a forward wall 34, a nozzle 36, and an injector orifice 38. The orifice 38, the nozzle 36 and the cylindrical wall 30 are all coaxial with each other, and in the as-mounted condition, they are also coaxial with the bores 18 and 22, as well as the cylindrical cavity 14. The head 12 defining the cylindrical cavity 14 includes a cylindrical outer wall 40 and a forward annular wall 42. The annular wall 42 bridges between the cylindrical wall 40 and the portion 16.

The injector tip 28 contains a valve seat 44 which is press-fit into a suitably sized recess within the injector tip 28. As can be seen in the Figure, the valve seat 44 is in the shape of an annulus coaxial with the orifice 38.

Snugly but slidably lodged within the bore 22 of the bearing 20 is an elongate pintle 46, having at the leftward end a closure head 48. It will be noted that the valve seat 44 and the closure head 48 are located within a chamber 50 located within the injector tip 28 and leftwardly of the portion 16. The closure head 48 has a greater diameter than the pintle 46, and defines a shoulder against which a return spring 52 bears at its leftward end. At its rightward end, the spring 52 bears against a spring spacer annulus 54 which lies within a bore in the portion 16, the bore extending rightwardly from the leftward extremity of the portion 16. It will be seen by examining FIG. 1 that the bore in which the spring spacer 54 is located communicates with the passageways 24, and thus allows gaseous material in the passageways 24 to pass leftwardly to the chamber 50. It will further be understood that, upon rightward movement of the closure head 48, gaseous material in the chamber 50 can pass to and through the orifice 38. The portion 16 is provided with an annular gallery 56 in which a suitable O-ring (not illustrated) would be provided, in order to prevent escape of pressurized gaseous material from the chamber along the interface between the cylindrical wall 30 and the portion 16.

The pintle 46 extends rightwardly from the bore 22 and into the cavity 14. The rightward end of the pintle has a tapering external thread and is adapted to tightly engage a central, internally threaded, tapering bore in an armature 60. The armature 60 is made of ferromagnetic material, such as soft iron, and is shaped to define a conical central hub 62 having an annular flange 64.

The cylindrical wall 40 of the head 12 terminates at the location 66, which means that the cavity 14 is open rightwardly. A closure for the open end of the wall 40 is provided by an electrically actuated multipole solenoid 68 which includes a base 70 having a peripheral flange 72 constituting a locking ring adapted to be pressed axially leftwardly against the cylindrical wall 40 by the provision of a cap locking ring 74. As can be seen, the flange 72 has an external step 76 and the cap locking ring 74 has a complementary shape for the purpose of engaging the step 7. The cap locking ring 74 further has an internal thread adapted to engage an external thread 78 on the wall 40. The wall 40 further has an annular gallery 80 intended to contain an O-ring (not illustrated) for the purpose of providing a seal preventing the gaseous pressurized contents of the cavity 14 from escaping along the interface between the flange 72 and the wall 40.

As illustrated, the solenoid 68 includes a first plurality of spaced-apart unwound cap ribs 82 (in this case four) which are integral with the base 70. The ribs are in the shape of flat parallel plates extending leftwardly from the base 70. Interspersed between adjacent pairs of the first plurality of ribs 82 is a second plurality of cap ribs 86, all wound with magnet wire. In the actual embodiment illustrated, the wire-wound ribs 86 are received in corresponding slots in the base 70, this being convenient for replacement of the wound ribs. However, if desired, the ribs 86 could be made integral with the base 70, as are the ribs 82.

It will be noted that all of the ribs 82 and 86 terminate, at their left ends, in a common plane defined by the rightward or "under" surface of the armature 60.

The embodiment of FIG. 1 also has a fibre optic port 90 which communicates with the cavity 14 through one of the unwound ribs 82, this being for testing purposes. The fibre optic port 90 would be eliminated from the ultimate commercialized version of this device.

FIG. 1 shows a gas inlet 92, and also shows one of two electrical feedthroughs 94, constituted by a tapering, Teflon-coated pin (only one illustrated in FIG. 1).

The length of the pintle 46 and the axial position of the injector tip 28 are so selected that, when the head 48 is seated against the valve seat 44, the armature 60 is spaced from the ribs 82 and 86, and when the armature 60 is seated against the ribs 82 and 86, the closure head 48 is off the valve seat 44, thus opening the orifice 38.

Figure 2:
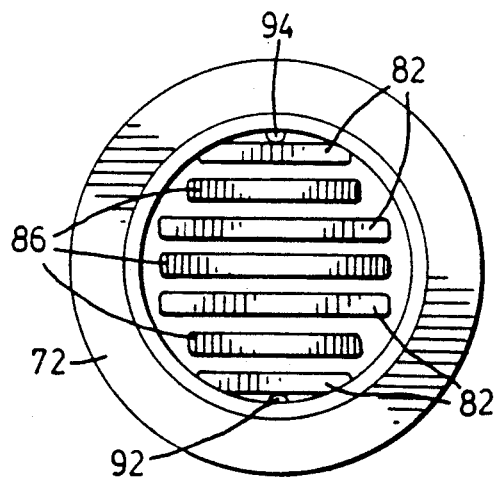
FIG. 2 is a view of the solenoid component of the assembly of FIG. 1, seen in the direction looking from left to right in FIG. 1.

FIG. 2 illustrates the solenoid 68 when viewed axially from left to right in FIG. 1, and with the armature 60 removed. It can be seen that the ribs occupy a substantially circular area. By comparing FIGS. 1 and 2, it will be appreciated that the armature 60 has a periphery closely following the circumference of the substantially circular area within which the ribs are located.

In operation, energization of the coils around ribs 86 will pull the armature disk 60 against the ribs. This lifts the head 48 of the pintle 46 away from the valve seat 44, allowing CNG to flow into the cylinder of the engine (not illustrated). Removal of the coil current allows the return spring 52 to close the head 48 against the seat 44, thus cutting off the flow of CNG. Once the head 48 of the pintle is seated, the CNG supply pressure helps hold the pintle closed due to the differential pressure between the injector and the cylinder.

TECHNICAL CONSIDERATIONS

To achieve fast response times, a high actuating force and a low armature/pintle mass is required. During preliminary calculations, based on an initial estimate of the armature mass, pintle lift, return spring preload, pressure differential force and response time desired, it was determined that a net actuating force of approximately 400 Newtons would be required.

The design of a high energy multipole solenoid was carried out according to the principles outlined by A. H. Seilly in his paper, "Helenoid Actuators-A New Concept in Extremely Fast Acting Solenoids", SAE Paper No. 810462. Seilly points out that large solenoids of conventional type are inherently slower than small ones, and the larger the force required, the slower the response time. Hence, when response times less than one milli-second are required, only tiny solenoids can be utilized. This is because the moving armature mass increases faster than the force generated at the working face area. The acceleration of a mass depends upon the force applied to it. With any solenoid, the force generated between the traction faces is limited by the magnetic saturation of the material. There is thus a maximum practical force which can be obtained for a given face area. The magnetic flux which passes through the face area must also pass through the armature body, hence the cross-sectional area of the armature must be at least as large as the traction face area. Flux densities at this face area must be as high as possible when the highest accelerations are required.

Figure 3A:
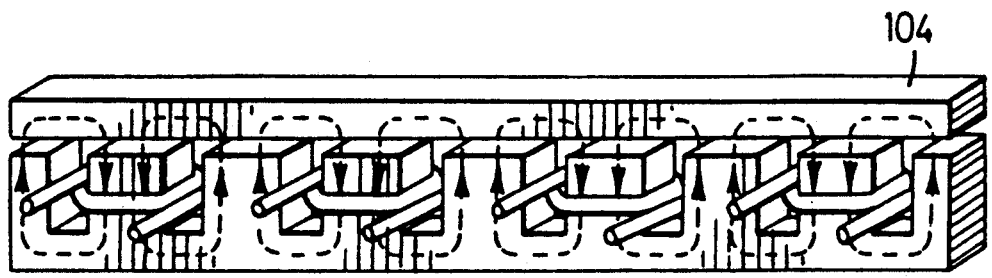
FIGS. 3a and 3b are perspective views of an elongated "E" solenoid and an elongated linear multipole solenoid, representing prior art and useful for explaining the essence of the present invention.
Figure 3B:
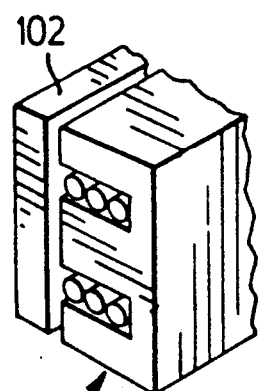

Seilly shows that if a typical E-shaped solenoid is analyzed, the armature mass will vary as a cubic function of its linear measurement, whereas the traction face area will vary in proportion to a square function of its linear measurement. Thus, for conventional solenoids, the larger the traction force required, the lower the acceleration. Seilly further shows that if the conventional E-shaped solenoid is increased in length, the mass of the armature will increase in proportion to the force, giving a constant acceleration. FIG. 3a and FIG. 3b show two different configurations for an "elongated" conventional solenoid. FIG. 3b shows a linear multipole solenoid, i.e. a solenoid with more than three ribs.

Figure 4A:
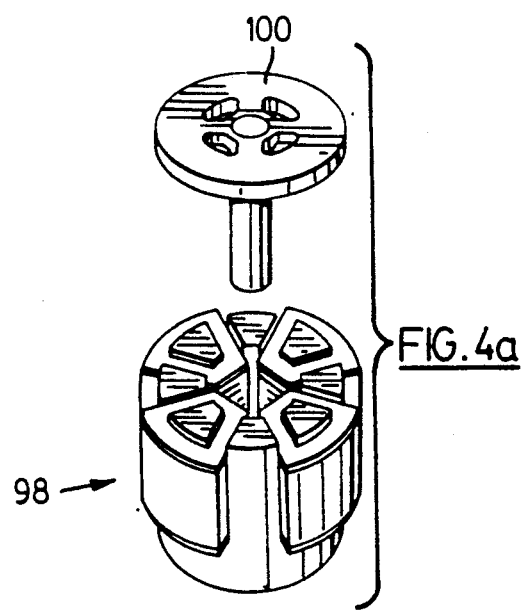
FIGS. 4a and 4b are perspective views of multipole solenoids shaped to cover a circular area.

By bending the linear multipole solenoid 96 of FIG. 3b into a ring 98 with sector-shaped poles, as shown in FIG. 4a, acceptable rigidity in the armature 100 can be achieved. Contrast this with the elongated armatures 102 and 104 required for the configurations of FIGS. 3a and 3b, where rigidity problems will arise due to the elongation.

Figure 4B:
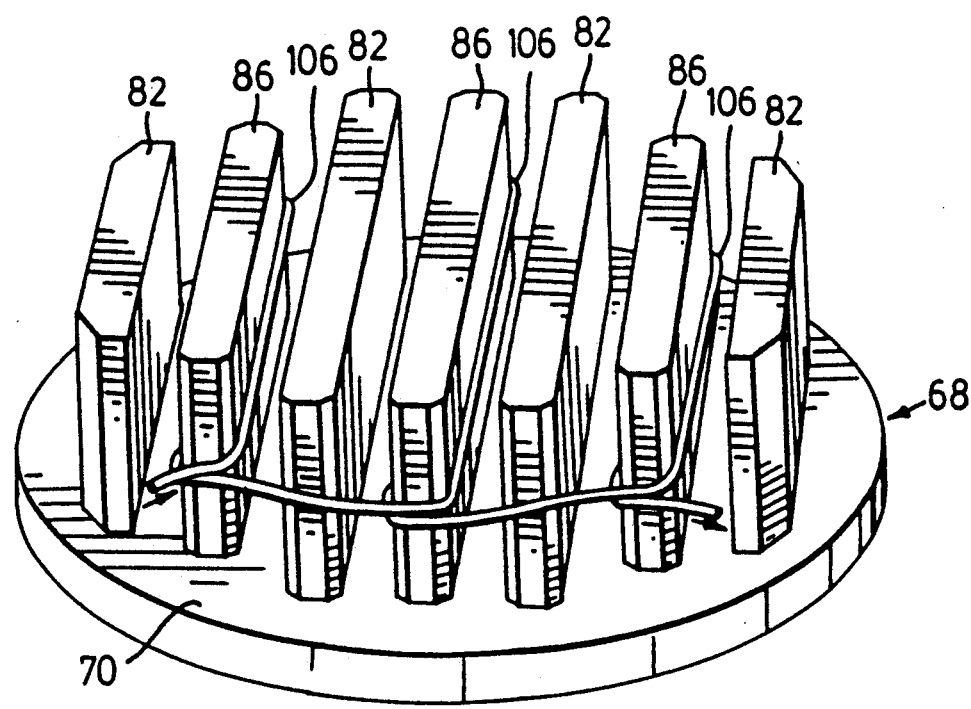

For the design of the present device, the arrangement shown in FIG. 4b was used, this being a linear multipole solenoid with three coils (represented in simplified form by single windings 106) having ribs 86 of different lengths chosen to fit the maximum face area into the available maximum diameter. This design is considered to provide greater face area than the sector design shown in FIG. 4a, and was much easier to construct.

Annealed mild steel was used for both the solenoid 68 (including the ribs) and the armature 60. Although other materials can support a higher flux density, they often have a higher residual magnetism after the coil current has been removed, which could result in slow or erratic armature return response.

Based on high energy solenoid efficiencies of 30 to 45%, it was decided to design for a theoretical traction force of 800-1000 Newtons. The equation relating the maximum theoretical force, flux density and traction face area is (2):

$$F = \frac{B^2 A^2}{2\mu_o}$$

where:
F is force in Newtons
B is flux density in Teslas
A is traction face area in square meters
$\mu_o$ is permeability of free space ($4\pi \times 10^{-7}$) in Webers/(Ampere meter)

Assuming flux density saturation occurs in mild steel at approximately 1.7 Teslas and a required force of 900 Newtons, a face area of 780 square millimeters (1.205 square inches), was indicated. The required value of ampere-turns was then calculated from (2):

$$Ni = \frac{Bl}{\mu_o}$$

where:
N is the number of turns per pole
i is the current in Amps
B is the flux density across the air gap in Teslas
l is the length of the air gap in meters
$\mu_o$ is the permeability of free space An air gap of 0.0003 meters was used yielding 405 ampere/turns needed. The next step was to decide how to split the required ampere/turns into specific N and i values. Ideally a low value of N, and hence a low inductance, with a high i yields the required force with a small time constant. However this results in excessively high current densities and places a high demand on the driving circuit. It was decided to use 50 turns and 10.0 amps as a starting point. This information along with the face area required determined a coil rib height of 11.5 mm (0.45 in.), an armature disk diameter of 46 mm (1.8 in.), and a coil rib and armature thickness of 3.2 mm (0.125 in.) and 2.4 mm (0.093 in.) respectively. The coil wire gauge used was 22 Awg.

MATERIALS

The injector tip 28 was made of stainless steel, and as previously mentioned, the head 12 was of brass. By having an adjustable locking ring 100 also threaded on the portion 16 of the head, the injector tip 28 can be screwed on and locked at various positions, thus allowing for adjustment of the pintle stroke by moving the armature disk 60 closer or further away from the coil ribs 82 and 86. This method of stroke adjustment varies the spring preload whenever the lift is changed, but this can be compensated by addition or removing shims to the spring spacer 54.

The valve seat 44 was originally made of brass, press-fit into the injector tip 28. However, during testing it was found that brass was too soft a seat material, and tended to yield under the impact loads. The brass seat was replaced with an SPS steel (3140) seat. The contact angle on the seat was 30 degrees, and the minimum radius of the seat Was 4.4 mm (0.173 in).

The pintle bearing 20 was of oil-impregnated bearing bronze, and was press-fit into the portion 16 of the head. In the test embodiment, six passages 24 of 2.4 mm diameter were drilled surrounding the bearing 20, to allow for flow of CNG from the cavity 14 to the chamber 50.

As previously mentioned, the solenoid 68, including the flange 72 and the ribs 82, 86 were made of annealed mild steel.

In our prototype, the armature/pintle assembly weighed 44 grams. The traction force applied to the mild steel armature 60 was transmitted to the SPS (3140) steel head 48 through the slender pintle. The small sectional area of the latter was required to reduce the mass of the moving part, and did not exhibit any load problem since the rod was subjected only to tensile loads.

One critical section of the assembly was the connection of the pintle 46 to the armature 60. This was an area of numerous redesigns, which are discussed later in this description. A Detroit Diesel series 92 injector spring (part #5228596) was used as the return spring 52. This spring has a spring rate of 900 lbf/in.

SOLENOID DRIVING CIRCUIT

The following expression gives the voltage across an inductor (coil):

$$V = L\frac{di}{dt} + i(t)R$$

where:
V is voltage
L is coil inductance
i(t) is current, a function of time
R is coil resistance The initial force (when i(0)=0) is determined by the rate of increase of current, di/dt. In the above equation, it may be seen that for a given coil inductance, di/dt is proportional to the voltage applied. Thus, initial force and therefore response time is increased as the voltage supplied becomes greater.

Figure 5:
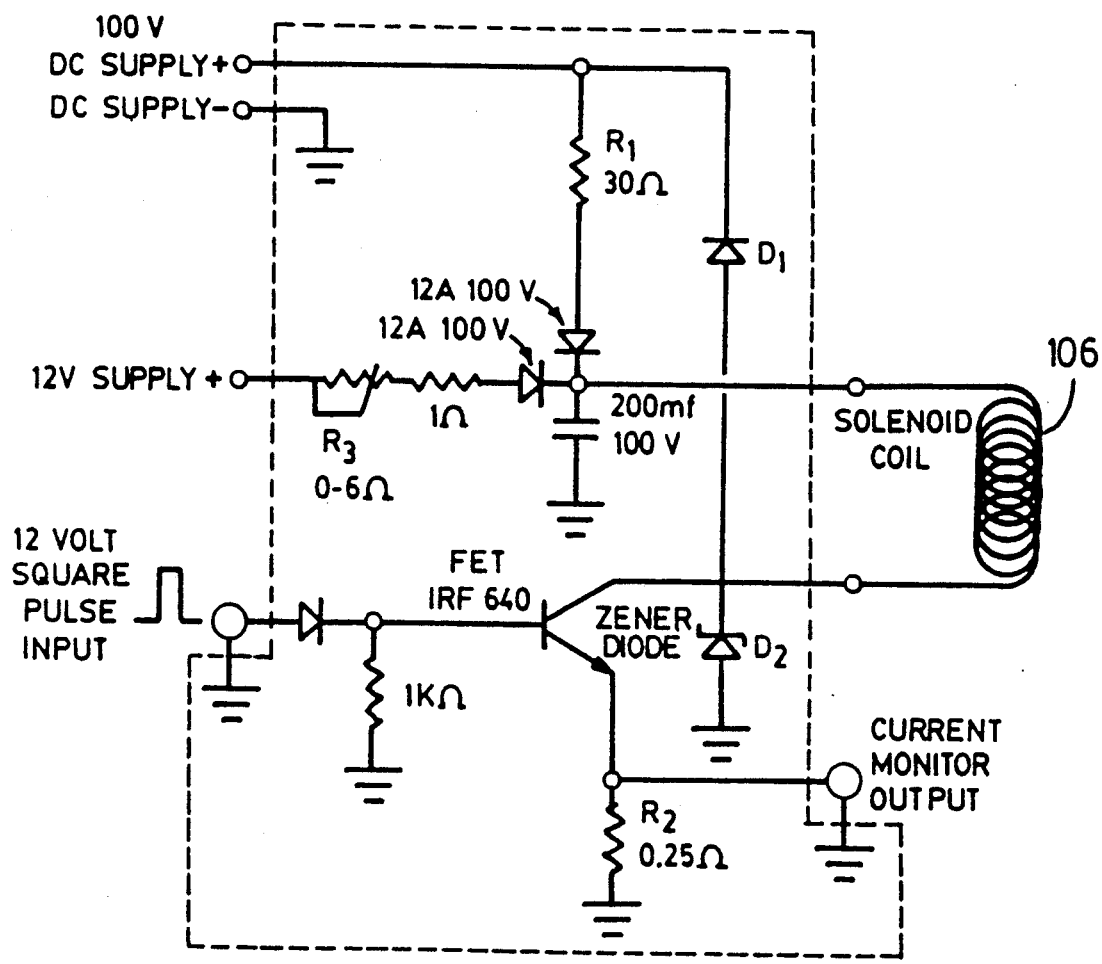
FIG. 5 is a wiring diagram for a capacitive discharge driver for the injector of this invention.

To achieve these high initial voltages a capacitive discharge driver was designed for the injector. The circuit used, shown in FIG. 5, is based on C. A. MacCarley, "Electronic Fuel Injection Techniques for Hydrogen Fueled Internal Combustion Engines", Masters Thesis, University of California, Los Angeles, 1978.

The driver for the prototype used the mains power, transformed and rectified to provide the 100 volt dc supply. In the future this voltage could be produced from a 12 volt battery using a dc to dc converter. The basic principles of the driver are as follows. The capacitor is charged to 100 volts through a current controlling resistor, (R1). When the FET switch (IRF 640) closes, the capacitor is discharged through the coil to ground. This initial high voltage causes the armature to be pulled against the coil core. With the air gap between armature and coil reduced, only a small current is needed to hold it there. This holding current is supplied by the 12 vdc input through an adjustable resistor (R3). When the FET is opened, coil inductance produces a large reverse voltage spike. Typically, switching transistors are protected from this effect by installation of a protection diode across the coil terminals such that it is reverse biased during normal operation. However, the discharge path provided by this diode leads to long current decay times, thus long valve closure times. This problem may be overcome by connection of the protection diode (D1) so as to be forward biased from the drain of the FET to the high voltage supply. Reverse coil voltages up to the level of the high voltage supply, but not exceeding it, are allowed without current flow. Transistor protection is provided while still allowing for large, but not infinite —di/dt transients. The FET was fed a low power 12 volt logic pulse which determined timing and pulse duration. A zener diode (D2) for backup FET protection, and a ¼ ohm resistor (R2) for monitoring coil current, were included in the driving circuit. A trace showing the current response of the driver is given in FIG. 6a. Note the rapid current rise and sharp drop off to the lower holding current value. This indicates correct sizing of the capacitor in the system.

DISPLACEMENT SENSOR

Although ensuring that the only moving part of the injector was fully enclosed added to the safety and reliability of the injector, this made it difficult to monitor the armature lift using conventional methods. Also, the presence of large transient magnetic fields in the location of movement rendered inductive and magnetic sensors of little value.

Figure 7:
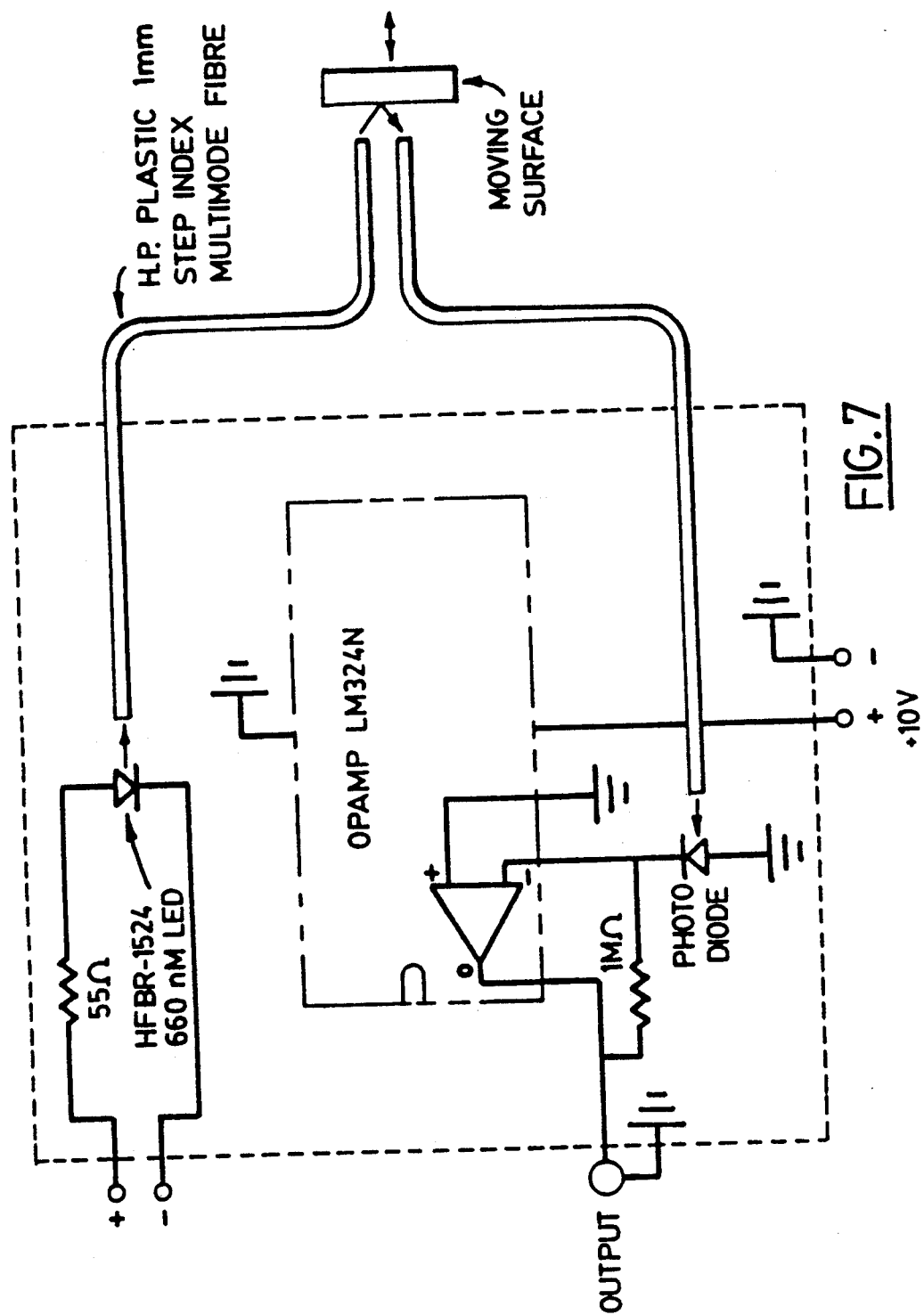
FIG. 7 is a wiring diagram for a fibre optic displacement sensor useful in evaluating performance of the present invention.

A fibre optic displacement sensor was designed which was non-intrusive mechanically, insensitive to magnetic and electrical noise, and easily installed in the port 90 of the device 10 while maintaining high pressure integrity. The sensor is shown schematically in FIG. 7. Light emitted from a 660 nm LED was channeled by a plastic multimode step index fibre through the injector base 70 and down one rib (see FIG. 1) to shine on the surface of the armature disk. Another fibre placed directly alongside the transmitting fibre inside the rib received the reflected light and sent it to a photo diode. The photo diode output was amplified and sent to a digital oscilloscope where voltage traces could be recorded. The fibres entering the injector were passed through stainless steel tubing which was potted with high-temperature, high-strength epoxy. This tube was fitted to the solenoid with a Swagelok fitting.

At very small separations of the fibre ends and the armature (0.05 mm), almost all of the transmitted light is reflected back into the fibre from which it emerged. As the separation increases the amount of light reaching the detector fibre increases until the input face of the receiving fibre is filled with light. With further separation, over approximately 2 mm, the detector output decreases according to an inverse square law. The initial or increasing interval of the detector output is very close to a linear function of separation. The location and size of this linear section depends on the specific fibre size and configuration. In the prototype, 1 mm diameter fibres were used and were placed directly side by side and at a minimum distance of 0.8 mm from the armature. One problem with this system as a quantitative sensor was drift over time due to the change in reflectivity of the moving surface. With the prototype injector, however, frequent calibration was easily done by moving the injector head relative to the armature by rotation of the head. The trace in FIG. 6b shows the optic displacement sensor output. The low frequency wave at the right was 60 cycle interference at the signal amplifier. This was later corrected by proper shielding. The apparent pintle bounce upon closure was actually a longitudinal elastic oscillation of the armature/pintle connecting rod. This was determined by temporarily inserting the optic displacement probe at the pintle end through the injector tip. This showed one small secondary opening but not the repeated symmetrical oscillation observed at the armature end.

TESTING AND RESULTS

After machining and assembly of the parts the valve was set in a test stand to measure performance and durability. The lift was initially set at 0.38 mm (0.015 in) with an orifice diameter of 1.6 mm (0.063 in). This orifice size was known to be too small to pass the desired flowrate but was used as a starting point from which the orifice could be incrementally enlarged until the required flowrate was achieved. The spring preload was set at 100N (22 lbf). The minimum seat diameter was 4.4 mm (0.173 in), opening at a 30 degree angle (from horizontal) to a maximum diameter of 7.62 mm (0.30 in). Commercial grade nitrogen was supplied from a 19.3 MPa (2800 psi) compressed gas bottle through a regulator which held the supply pressure at 2.07 MPa (300 psi) plus or minus 1%. The regulator droop during testing was noted to be approximately 0.2 MPa (30 psi). The gas exiting from the injector was piped into a bell prover at a pressure of 12 mm (0.5 in) water column. A measured displacement of the bell prover was timed to determine average flowrate. Intermittently during flow testing the exit tube was redirected to a wet test meter where the injector's closed leakage rate was measured. The logic pulse, pintle lift and current traces were recorded on a Nicolet digital oscilloscope.

Figure 8:
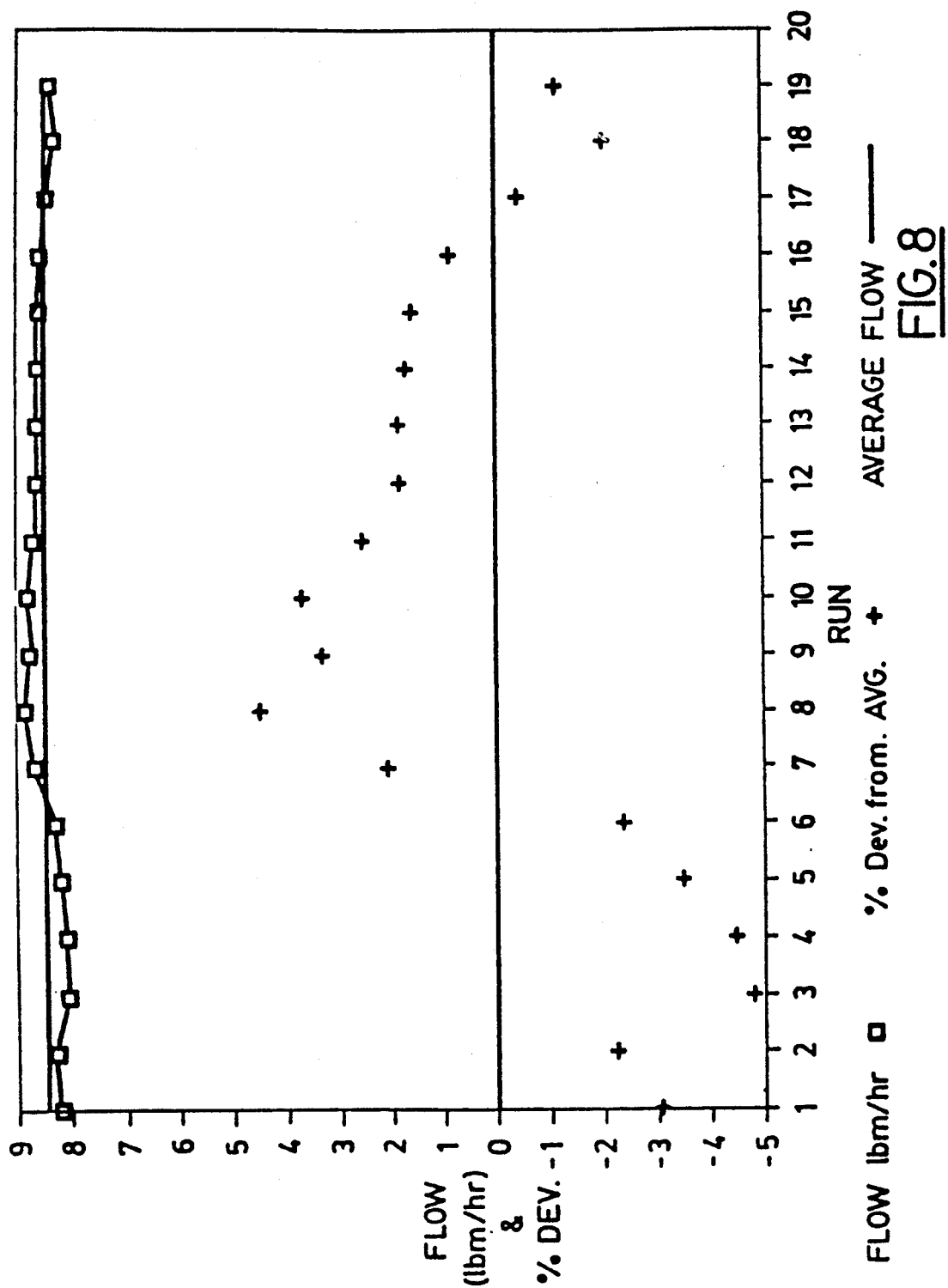
FIGS. 8 and 9 are graphs of flow deviation from average.

FIG. 8 shows the average flow and deviation from average for a number of test runs. With the lift at 0.38 mm (0.015 in) the maximum frequency of injection attainable was 1875 injections per minute. The flowrate was low as expected and the flow division was plus or minus 5%.

Figure 9:
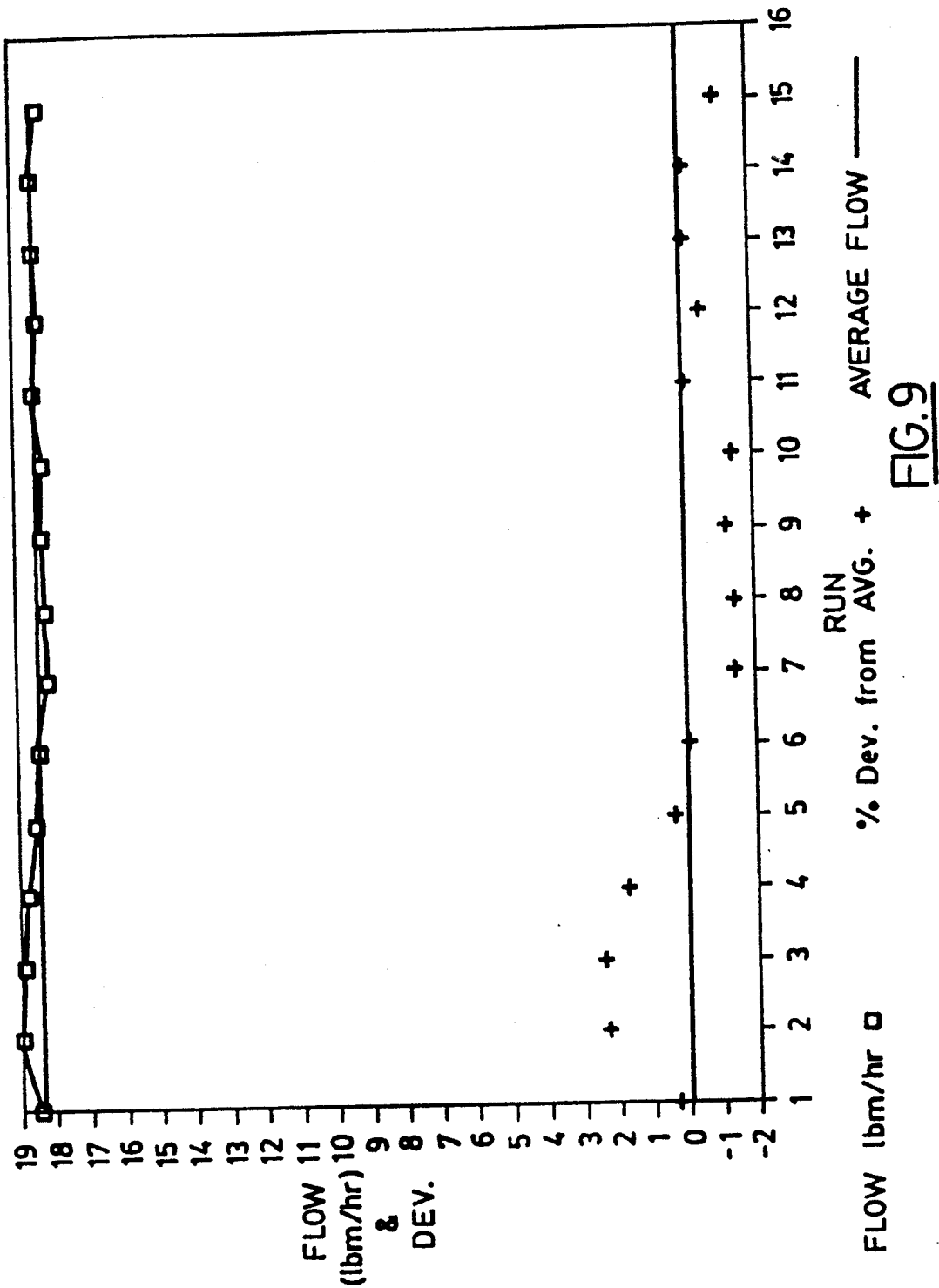

Inconsistent valve closure was thought to be the cause of the flow variation, so the spring preload was increased to 220N (48 lbf). The pintle lift was reduced to 0.25 mm (0.010 in) and the orifice diameter was stepped up to 1.78 mm (0.070 in). These modifications produced more desirable results as shown in FIG. 9. The average flow was now 8.35 Kg/hr (18.4 lbm/hr) of nitrogen which was equivalent to 6.3 Kg/hr (13.9 lbm/hr) of CNG. The deviation in flowrate had dropped to plus or minus 2.5%, some of which could be accounted for by the pressure regulator drift.

Figure 10:
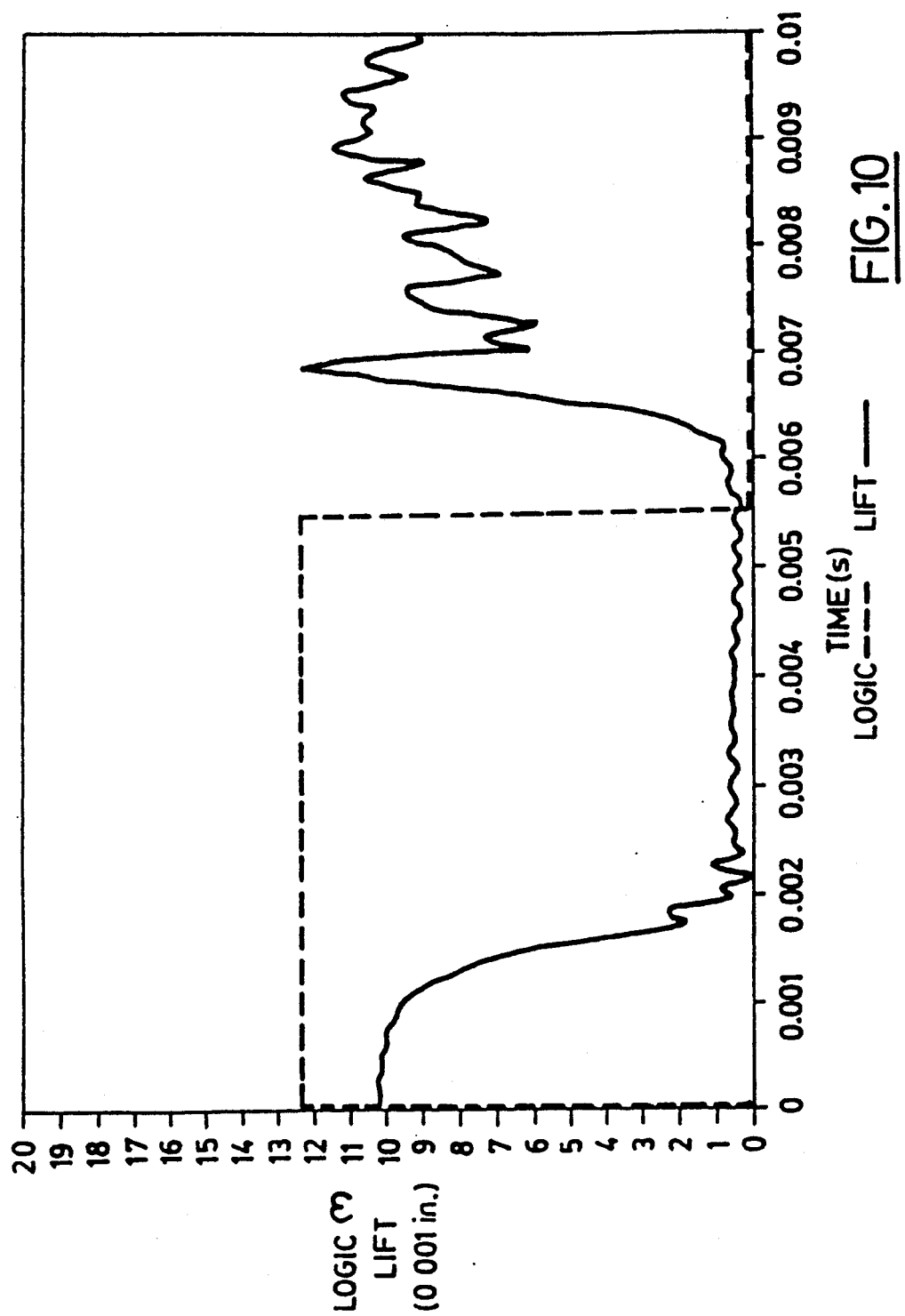
FIG. 10 is a composite graph showing logic voltage and lift vs. time.

A typical pintle lift and logic pulse trace as shown in FIG. 10 shows the response of the injector. The injector was operating at 2100 injections per minute (IPM) with a logic pulse width of 5.5 ms. There was a 1 ms lag from the leading edge of the logic pulse to the start of movement of the pintle. This lag was found to be somewhat frequency dependent, ranging from 0.8 ms for one shot injections to 1 ms at 2100 IPM. This dependency was most likely due to the driver circuitry rather then the valve itself. At higher IPMs the period between injections was shorter leaving less time for the capacitor in the driving circuit to charge to the full supply voltage. This lower capacitor voltage at the time of injection would yield a lower pull-off force and hence a slightly longer delay time before full injector opening.

FIG. 10 also shows the injector closure delay from the end of the logic pulse. This closure delay is dependent on the fixed parameters of valve lift and spring preload. Surprisingly, within certain limits, smaller lifts tended to increase the closure delay. This was thought to be due to the gas flow dynamics in the pintle seat area. The spring preload can have a drastic effect on closure delay times. As the preload is reduced, delay times become erratic and can be as long as 4 to 5 ms. This closure delay time was caused by the decay time of the magnetic field in the coil and the residual magnetism left in the armature disk. The former can be reduced by a lower inductance coil but as mentioned earlier this demands higher current flow and pushes the drive circuit design beyond practical limits. The latter cause, residual magnetism, can be dealt with in two ways. One is t reduce the amount of residual magnetism in the armature by having a laminated construction. This reduces the induced eddy currents in the armature and thereby speeds the reduction of the flux density. A second method is to not allow the armature disk to come in direct contact with the coil core. This does not reduce the residual magnetism but it does moderate its effect on closure delay.

Figure 11:
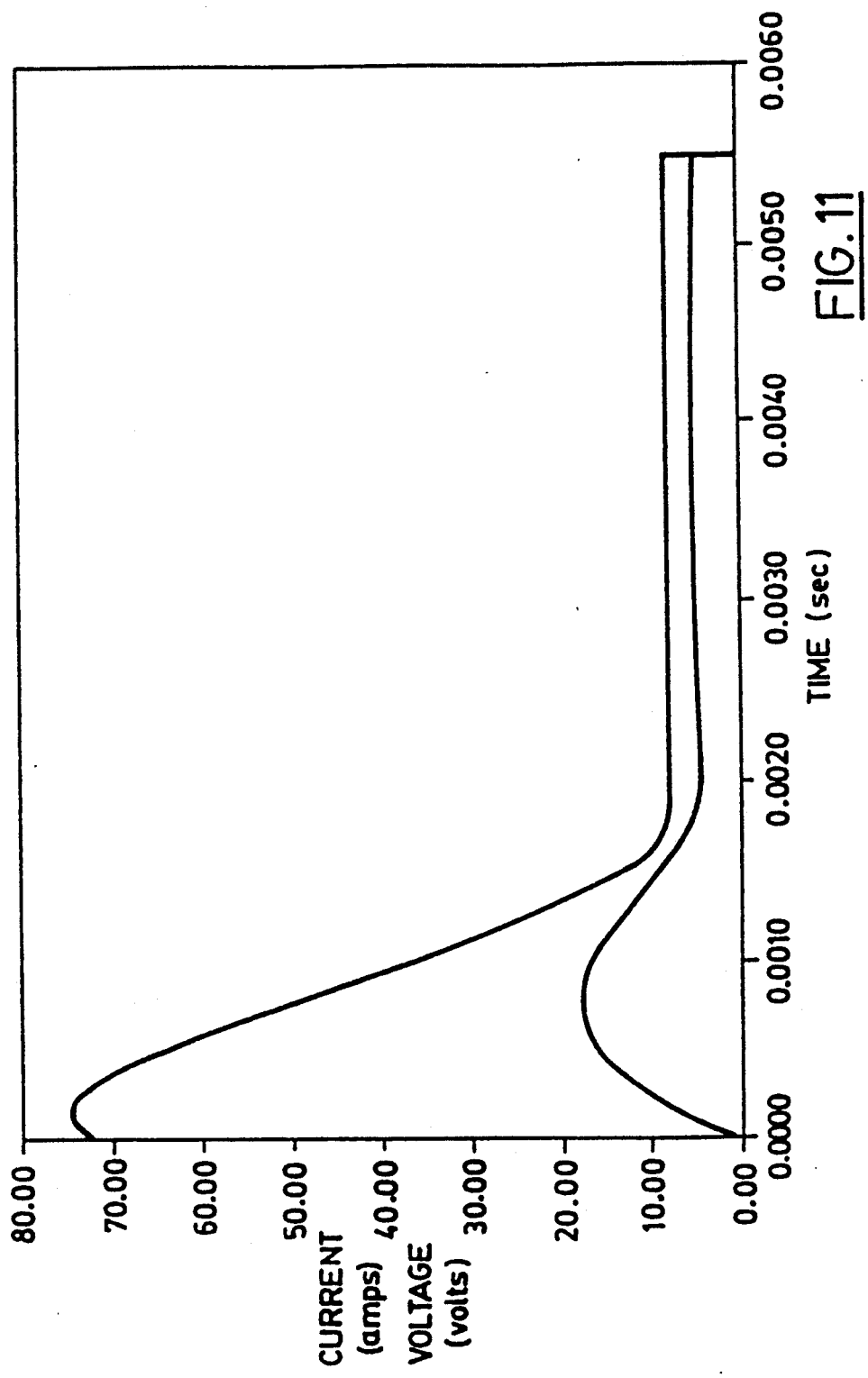
FIG. 11 is a graph showing coil voltage and coil current vs. time.

FIG. 11 shows a trace of current through the coil and voltage across the coil terminals. From this trace the average power consumption of the injector can be calculated. The power consumption over the injection duration was 208 watts for a 5.5 ms logic pulse width. When this power draw is multiplied by the maximum duty cycle of the injector (5.5/28.5) the average power consumption drops to 40 watts. It must be stressed that this is the power use at the injector. The actual power drawn from the mains supply is dependent on the efficiency of the driver circuit. In the driver used for testing there was a significant power loss at the current limiting resistor (R1). This could be overcome by using a transistor and pulse with modulation to control the current charging the capacitor.

Once the desired flowrate had been attained, limited durability testing was begun. The injector was operated with compressed air supplied at 60 to 95 psi. The initial geometry of the valve head 48 was a hemisphere meeting a 30 degree tapered seat chosen to give good sealing. The seat material was originally brass. After 20 hours of testing it was noted that the brass seat was being beaten lower and lower, thus increasing the pintle lift. The solenoid was eventually unable to lift the pintle head off its seat due to the increased separation of the armature from the ribs 82 and 86.

The seat material was changed to a 3140 steel and the pintle head geometry was changed to a 30 degree taper, matching the seat. This arrangement exhibited the same tendency, and indications of spalling and microwelding began to show up on the pintle head and seat. The leakage rate of the injector also increased.

A calculation of the impact forces on the seat indicated that it would be necessary to harden the seat and pintle to prevent yielding. The seat and pintle were hardened to Rockwell 60 and 55 respectively. This corrected the yielding and showed no signs of spalling or microwelding. The leakage rate was brought down to an acceptable level, less then 20 gm/hr, by lapping the pintle head and seat after hardening. During testing it became apparent that with this hardened seat arrangement the leakage rate became very sensitive to particulate impurities in the fuel gas. A 0.2 micron line filter helped solve this problem and would be required for any application of the injector.

With the early prototype then under test, the threaded connection between the pintle rod 46 and the armature disk 60 failed at the 40 hour mark. Upon inspection it was found that cyclic fatigue crack growth ending in fracture had occurred. The pintle rod under test had a shoulder notch at its smallest section, which is where the crack had begun. A non-tapering threaded connection had been utilized, and the shoulder notch on the pintle allowed the two parts to be locked together. The connection was redesigned by eliminating the shoulder and notch and enlarging the sectional area at the rod/armature interface. With the redesigned pintle rod (still with a non-tapering thread), there was no shoulder to lock the rod against the armature disk, so an axially opposing grub screw was used to fix the connection. The problem with this arrangement was that the alignment of the pintle rod and armature disk, i.e. that they be perpendicular, was now determined by a threaded connection. If the surface of the disk was out of alignment it would be flexed into alignment every time the disk contacted the coil core. This problem expressed itself as another failure of the pintle rod at the 44 hour mark. Another problem area that showed up at this time was the armature disk hub that held the female thread for the pintle rod. The hub was approximately cylindrical. A fatigue crack had started at the fillet of the hub and the underside of the disk. It was decided to taper the hub more gently towards the underside of the disk and that a better surface finish would have to be specified. To solve the alignment problem a taper was put on the end of the pintle rod just preceding the end thread. This taper was matched with a taper in the armature disk collar so that when the rod was threaded into the collar the taper itself would provide both alignment and tightening of the joint. This solution worked well and to date no further fatigue problems have occurred in this area. This final design is the one shown in FIG. 1.

Up to this point in the testing, the coil windings had been simply wound onto the ribs and no covering or potting had been used. After 50 hours of running, one of the tangs at the end of the rib inserts, which held the windings from slipping off the top of the rib, broke and shorted out the coil winding. It was anticipated that there could be continuing problems with the windings if they were left unprotected from the pounding of the armature disk. To protect the windings an epoxy potting was used to encase the entire multipole coil unit. The epoxy used was a high-strength, high-temperature mixture which had a sufficient compressive strength to withstand the impact of the armature disk. It also had the added benefit of absorbing the impact over a greater surface area, which further enhanced the durability of the coil assembly.

Figure 12:
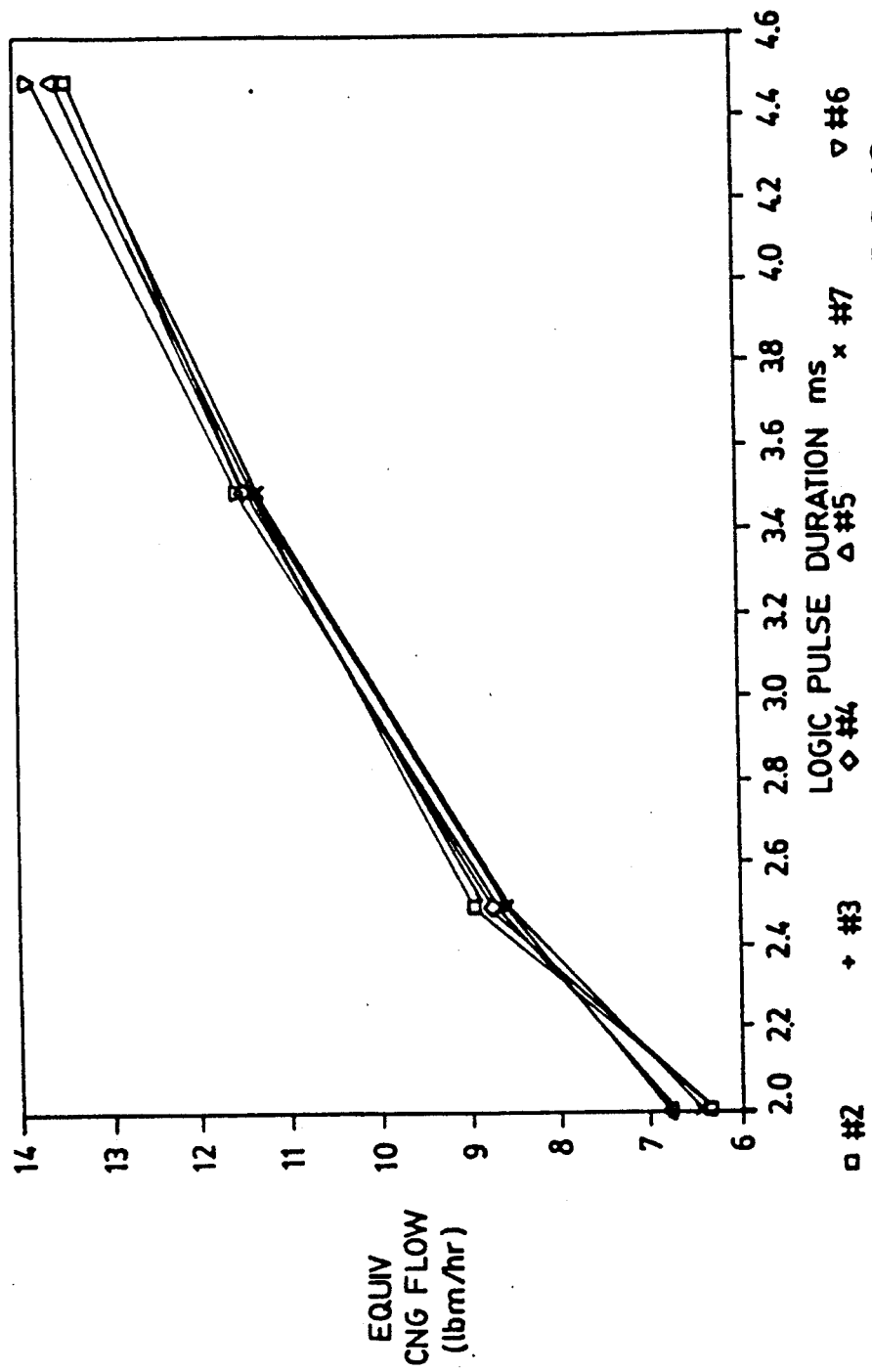
FIG. 12 is a graph showing flowrate vs. logic pulse duration.

The prototype was tested for 65 hours and it appeared that the major hurdles had been overcome. The first run of eight injectors was then manufactured, assembled and flow tested to assure matched flowrates. FIG. 12 shows flowrate vs logic pulse duration for the six valves to be used on the engine. The response is fairly linear until the pulse width drops below 2.5 ms. For pulse widths less than 2.5 ms, transient flow effects produce nonlinearities in the pulse width vs. flowrate. Although the response is not linear at short durations it was reported by the end users of the injectors that flow control was very good even at extreme turndown ratios.

Figure 13:
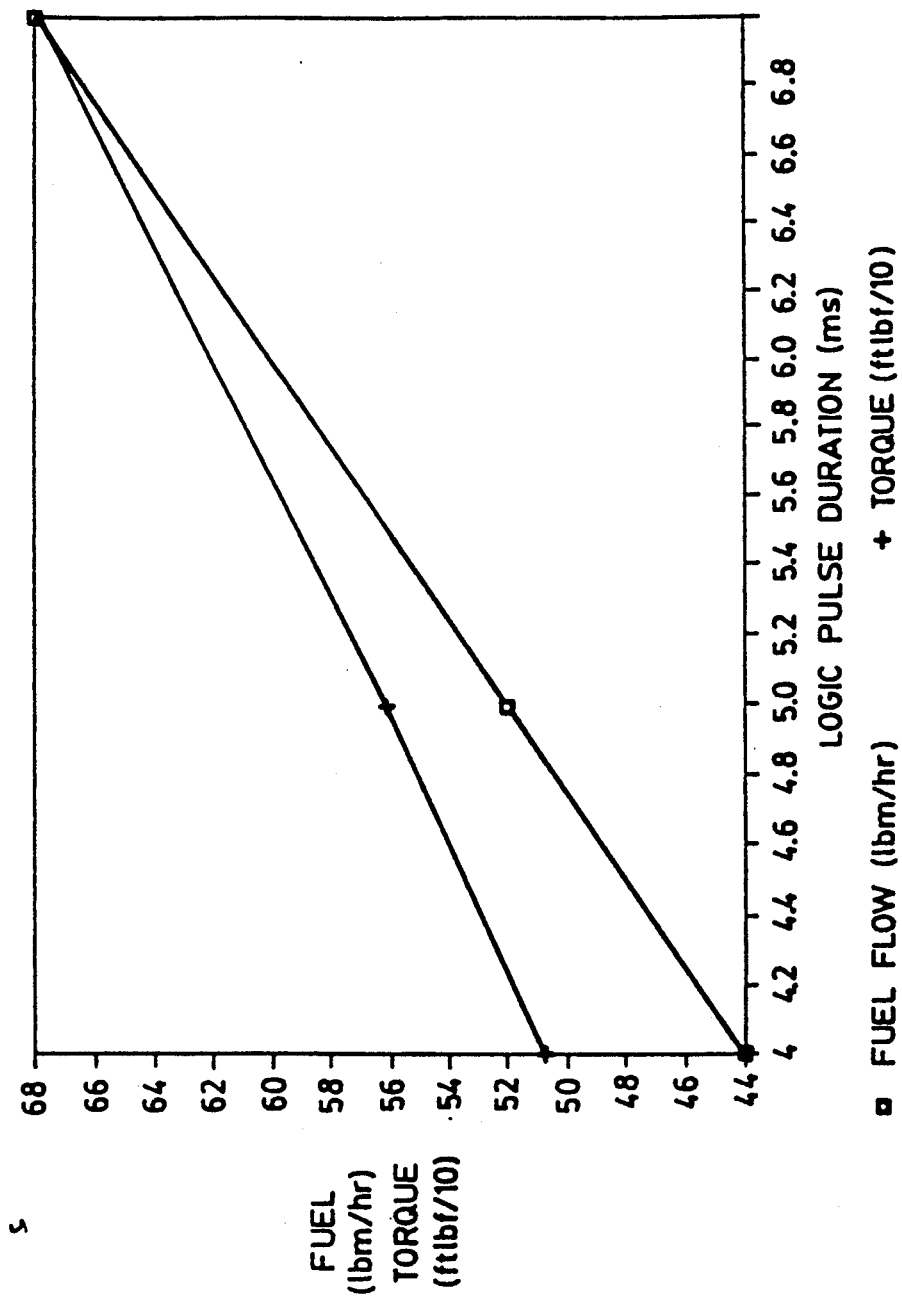
FIG. 13 is a graph of fuel consumption and torque vs. logic pulse duration.

The injectors were installed into a Detroit Diesel 6V92TA engine and were run for approximately 50 hours. Preliminary results shown in FIG. 13 confirm that good control of engine torque can be achieved by controlling the logic pulse width.

While one embodiment of this invention has been illustrated in the accompanying drawings and described hereinabove, it will be evident to those skilled in the art that changes and modifications may be made therein without departing from the essence of this invention, as set forth in the appended claims.

The embodiments of the invention in which an exclusive property or privilege is claimed are defined as follows:

1. A device for timing and metering gaseous fuels, comprising:

means defining a substantially cylindrical solenoid cavity open at one end of the cylindrical configuration, said means including a portion projecting away from the cavity in the direction opposite said one end, said portion having a bore coaxial with said cylindrical configuration, gas passageway means in said portion, an injector tip secured to said portion in such a way that its position is adjustable longitudinally with respect to said bore, the injector tip defining an injector orifice, a valve seat upstream of said orifice and coaxial with said bore, and a chamber upstream of said valve seat, said chamber communicating with said cavity through said passageway means, an elongate pintle snugly but slidably lodged within said bore, the pintle having at one end a closure head located within said chamber, the closure head being adapted to seat against said valve seat to close said orifice, resilient means for urging said closure head against said valve seat to close said orifice, an electrically actuated multipole solenoid including a base constituting a cap for closing the open end of said cavity, a first plurality of spaced-apart, unwound cap ribs projecting into the cavity from the base and being in magnetic communication with said base, a second plurality of cap ribs wound with magnet wire interspersed between said first plurality of ribs and being in magnetic communication with said base, all ribs terminating at a common first surface, and an armature of ferromagnetic material for the solenoid, said armature being secured to the other end of said pintle and defining a second surface complementary to said first surface, the pintle having a length such that, when the head is seated against said valve seat the armature is spaced from said ribs, and when the armature is seated against said ribs the head is off said valve seat, thus opening said orifice.

2. The device claimed in claim 1, in which all ribs are in the shape of flat parallel plates occupying a substantially circular area when viewed in a direction parallel with said bore.

3. The device claimed in claim 2, in which the armature is a disc of which the periphery follows the circumference of said substantially circular area.

4. The device claimed in claim 3, in which the pintle has at said other end a tapering external thread which is tightly screwed into a central, internally threaded, tapering bore in the armature, thus connecting the pintle and the armature together.

5. The device claimed in claim 1, in which the seat and the valve head are hardened to Rockwell 60 and 55, respectively.

* * * * *